United States Patent
Georgescu

[15] 3,697,878
[45] Oct. 10, 1972

[54] METHOD AND APPARATUS FOR OBTAINING FREQUENCY MARKER PIPS ON THE WOBBULATED GENERATORS

[72] Inventor: Gheorghe Georgescu, Bucharest, Romania

[73] Assignee: Uzinele Electronica, Bucharest, Romania

[22] Filed: Oct. 27, 1970

[21] Appl. No.: 84,342

[30] Foreign Application Priority Data
Oct. 30, 1969 Romania........................61407

[52] U.S. Cl. .................328/17, 324/57 R, 324/77 B, 331/39
[51] Int. Cl. ...........................................H03b 21/00
[58] Field of Search ........328/15, 16, 17; 331/39, 76, 331/178; 324/57 R, 77 B, 77 CS

[56] References Cited
UNITED STATES PATENTS

| | | |
|---|---|---|
| 2,702,861 | 2/1955 | Wingate ....................331/178 |
| 3,256,493 | 6/1966 | Wu...............................331/39 |
| 3,320,531 | 5/1967 | Wu...........................324/77 B |
| 3,379,975 | 4/1968 | Niedereder............331/178 X |
| 3,382,432 | 5/1968 | Schittko et al..........324/57 R |
| 3,427,536 | 2/1969 | Wainwright..............324/57 R |

*Primary Examiner*—John S. Heyman
*Attorney*—Karl F. Ross

[57] ABSTRACT

A signal wobbulating in a certain range is mixed with a pair of fixed-frequency signals having frequencies corresponding to the upper and lower limits of the range. A pair of independent intermediate-frequency outputs are produced which are each fed to at least two tuned circuits associated with detection diode and pickup coils. The outputs of these diodes are combined and serve as frequency-marking pips in the range of the wobbulating radio-frequency signal.

5 Claims, 1 Drawing Figure

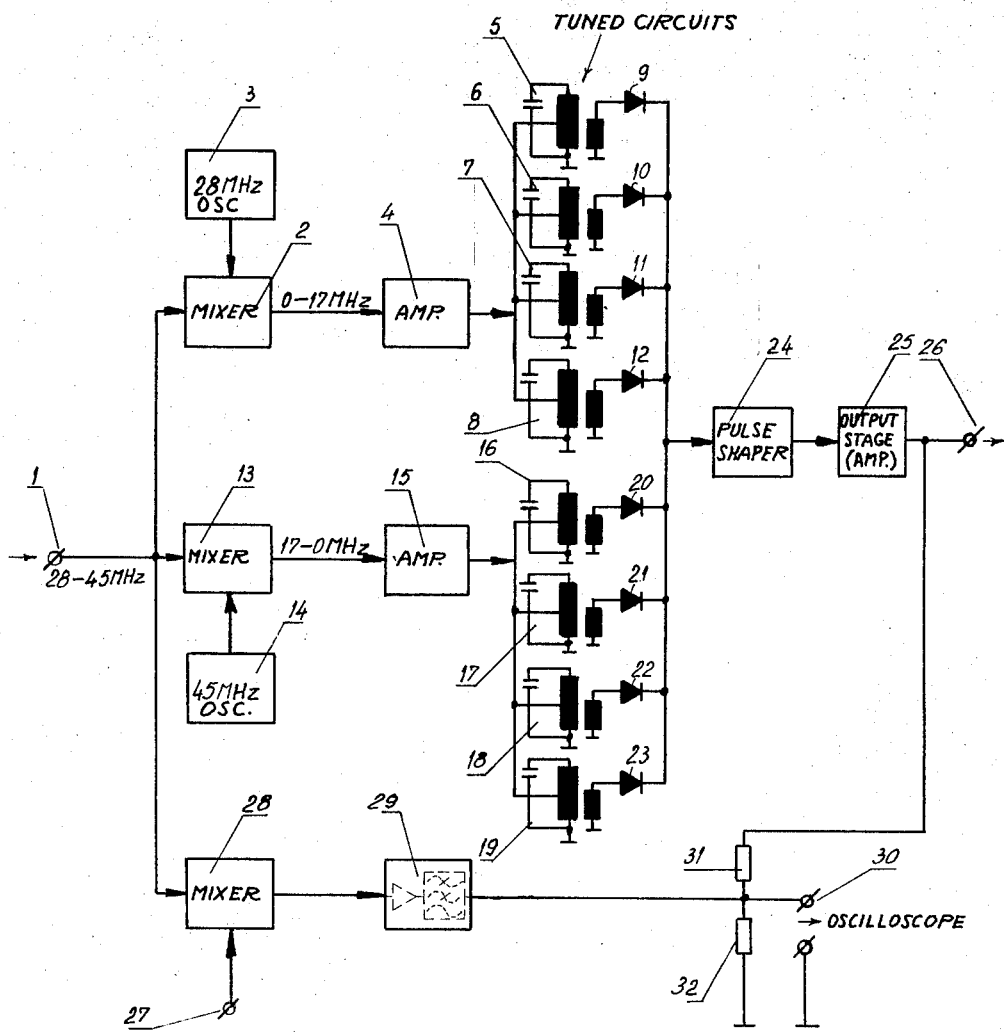

METHOD AND APPARATUS FOR OBTAINING FREQUENCY MARKER PIPS ON THE WOBBULATED GENERATORS

FIELD OF THE INVENTION

The present invention relates to a method of and apparatus for obtaining frequency marker pips on a sweep frequency generator known as a wobbulator used in serial production of TV sets for intercarrier tuning.

BACKGROUND OF THE INVENTION

There are well known methods for obtaining frequency marker pips on such generators which use the beat produced between the generator output and the output of an oscillator tuned to a marking frequency.

These methods have the disadvantage of an elaborate circuit when a great number of marker pips we needed, as the beats produced between harmonics of marking oscillators must be avoided, and it is virtually impossible to change the positions of the marking pips.

There are also known methods which use transposition of a wobbulating signal (by mixing with a fixed frequency) into a lower frequency band, wherein tuned circuits on a frequency identical to the difference between the marking frequency and the frequency of the fixed oscillator are used for obtaining marker pips.

These methods have a disadvantage in case a relatively high precision is needed since they require a limited frequency band for the tuned circuits.

OBJECTS OF THE INVENTION

It is an object of the present invention to overcome the above-given disadvantages.

Another object is to provide an improved apparatus for and method of obtaining marking pips in the frequency range of a wobbulating generator.

SUMMARY OF THE INVENTION

These objects are obtained, in accordance with features of the present invention by a method comprising the steps of mixing the wobbulating radio-frequency signal with a first radio-frequency signal having a fixed frequency corresponding approximately to the upper limit of the range and with a second radio-frequency signal having a fixed frequency corresponding approximately to the lower limit of the range to obtain respective first and second sweeping intermediate-frequency signals having a band width substantially equal to the difference between the first and second radio-frequency signals, passing each of the intermediate-frequency signals through at least two tuned circuits to produce at least four outputs, and combining these outputs to obtain frequency marking pips in the frequency range of the wobbulating radio-frequency signal.

Another feature of my present invention is an apparatus for obtaining frequency marking pips in the frequency range of a wobbulating radio-frequency signal comprising first and second fixed frequency oscillators having respective radio-frequency outputs corresponding respectively to the upper and lower limits of the range, respective first and second mixing means for beating the radio-frequency outputs of the oscillators with the wobbulating signal to produce respective first and second wobbulating intermediate-frequency outputs having a band width substantially equal to the band width of the range, respective first and second pairs of tuned circuits connected respectively in circuit with the first and second mixing means, each tuned circuit being responsive to a predetermined frequency to produce a signal output, and means connected in circuit with the tuned circuits for combining their signal outputs.

This apparatus can also comprise third mixing means adapted to be connected to a frequency generator to receive therefrom a fixed-frequency signal for combining same with the wobbulating radio-frequency signal and connected in circuit with the means for combining the signal outputs. The combining means includes a pickup coil and detection diode associated with each tuned circuit.

DESCRIPTION OF THE DRAWING

Below is given an example of the method in connection with the accompanying drawing, the sole FIGURE of which is a schematic circuit diagram of the apparatus for obtaining frequency marker pips on a wobbulator.

SPECIFIC DESCRIPTION

The apparatus according to the invention is intended for obtaining eight frequency marker pips on a wobbulated generator, for example on a 28–45 MHz band. From the input terminal 1 of the apparatus, the wobbulating signal in the 28–45 MHz band is applied to a mixing stage 2 together with the signal generated by a quartz oscillator 3 stabilized on 28 MHz frequency. The resultant intermediate-frequency signal having a frequency in a 0–17 MHz band, is amplified in an amplification stage 4 and supplied to tuned circuits 5, 6, 7, and 8 having restricted frequencies identical to the difference between the desired marking frequency and the frequency of the 28 MHz oscillator 3.

The frequencies that the oscillating circuits 5, 6, 7 and 8 are tuned to do not exceed 8 MHz, it being in this way possible to obtain four frequency marker pips placed on the first half of the wobbulating frequency band, in the 28–36 Mc/s band; at the same time the input signal is applied also to the mixing stage 13, where, by mixing with the signal generated by a quartz oscillator 14 stabilized on 45 MHz, the result is an oppositely wobbulating frequency in the 17–0 MHz band.

Similarly, this signal is amplified in an amplifier 15 and applied to tuned circuits 16, 17, 18, 19 whose frequencies are equal to the difference between the oscillator frequency of 45 MHz and the desired marking frequencies. The frequencies to which these circuits are tuned also do not exceed 8 MHz; one obtains in this way frequency marker pips in the second half of the wobbulated band, namely 37–45 Mc/s.

The low frequency signals picked-up from detection diodes 9, 10, 11, 12, 20, 21, 22, 23 are applied then to a marking-pulse shaper 24; at its output are obtained narrow pulses which are then applied to an output stage 25 which has an output terminal 26.

For controlling the correct position of frequency marker pips the apparatus is provided with an input terminal 27 for an external radio-frequency signal generator which feeds signals to a mixing stage 28, where through mixing with the wobbulated signal, a beat signal is obtained. This voltage is amplified in an amplifying stage 29 equipped with a low-pass filter and applied to a terminal 30, which can be connected to an oscilloscope to read the marker pips as pulses and beat markings to compare their position. The divider constituted by the resistors 31 and 32 is useful for superimposing the marking pulses.

The marking pulses of the frequencies obtained in this way have a sufficiently high amplitude, and can be applied to the modulation terminal Z of an oscilloscope by aid of which the frequency characteristic is drawn, thus obtaining marker pips by blanking; the marking pulses can be mixed with the input voltage in an oscilloscope, thus obtaining marker pips in the form of pulses on the frequency characteristics of the controlled circuit.

The present invention offers the following advantages;
frequency adjustment possibilities of the markers,
high stability of the frequency markers, and
reduced energy consumption and low cost.

I claim:

1. An apparatus for obtaining frequency marking pips in the frequency range of a wobbulating radio-frequency signal comprising:

first and second fixed frequency oscillators having respective radio-frequency outputs corresponding respectively to the upper and lower limits of said range;

respective first and second mixing means for beating said radio-frequency outputs with the wobbulating signal to produce respective first and second wobbulating intermediate-frequency outputs having a band width substantially equal to the band width of said range;

respective first and second pairs of tuned circuits connected respectively in circuit with said first and second mixing means each of said tuned circuits being responsive to a predetermined frequency to produce a signal output;

means connected in circuit with said tuned circuits for combining said signal outputs; and third mixing means adapted to be connected to a frequency generator to receive therefrom a fixed-frequency signal for combining same with said wobbulating radio-frequency signal and connected in circuit with said means for combining said signal outputs.

2. The apparatus defined in claim 1 wherein the combining means includes a pickup coil and detection diode associated with each of said tuned circuits.

3. The apparatus defined in claim 1 wherein said first and second mixing means are so constituted and arranged that said wobbulating intermediate-frequency outputs have a frequency varying substantially between 0 Hertz and a frequency substantially equal to the difference between said radio-frequency outputs, said tuned circuits being tuned to frequencies lower than half the band width of said intermediate-frequency outputs.

4. A method of obtaining frequency marking pips in the frequency range of a wobbulating radio-frequency signal comprising the steps of:

mixing said wobbulating radio-frequency signal with a first radio-frequency signal having a fixed frequency corresponding approximately to the upper limit of said rage and with a second radio-frequency signal having a fixed frequency corresponding approximately to the lower limit of said range to obtain respective first and second sweeping intermediate-frequency signals having a band width substantially equal to the difference between said first and second radio-frequency signals;

passing each of said intermediate-frequency signals through a multiplicity of differently tuned low-pass-filter circuits to produce at least eight outputs; and combining said outputs through respective diodes to obtain frequency marking pips in the frequency range of the wobbulating radio-frequency signal.

5. An apparatus for obtaining frequency marking pips in the frequency range of a wobbulating radio-frequency signal comprising:

first and second fixed frequency oscillators having respective radio-frequency outputs corresponding respectively to the upper and lower limits of said range;

respective first and second mixing means for beating said radio-frequency outputs with the wobbulating signal to produce respective first and second wobbulating intermediate-frequency outputs having a band width substantially equal to the band width of said range;

respective first and second pairs of tuned low-pass-filter circuits connected respectively in circuit with said first and second mixing means, each of said tuned circuits being responsive to a predetermined frequency to produce a signal output;

a respective diode connected to each of said low-pass-filter circuits; and output means connected in circuit with said tuned low-pass-filter circuits via said diodes in parallel for combining said signal outputs.

* * * * *